(12) United States Patent
Vanhelle et al.

(10) Patent No.: US 8,279,092 B2
(45) Date of Patent: Oct. 2, 2012

(54) ELECTRIC CONTROL DEVICE

(75) Inventors: Stephanie Vanhelle, Marignier (FR);
Stephanie Dalmayrac, Annemasse (FR)

(73) Assignee: DAV, Creteil (FR)

( * ) Notice: Subject to any disclaimer, the term of this patent is extended or adjusted under 35 U.S.C. 154(b) by 501 days.

(21) Appl. No.: 12/665,392

(22) PCT Filed: Jun. 23, 2008

(86) PCT No.: PCT/EP2008/057942
§ 371 (c)(1),
(2), (4) Date: Dec. 18, 2009

(87) PCT Pub. No.: WO2008/000800
PCT Pub. Date: Dec. 31, 2008

(65) Prior Publication Data
US 2010/0182167 A1   Jul. 22, 2010

(30) Foreign Application Priority Data
Jun. 25, 2007   (FR) .................................. 07 04526

(51) Int. Cl.
*H03M 11/02* (2006.01)
*H01H 13/70* (2006.01)
(52) U.S. Cl. ........................... 341/20; 345/174; 200/343
(58) Field of Classification Search ........................ None
See application file for complete search history.

(56) References Cited

U.S. PATENT DOCUMENTS

| | | | |
|---|---|---|---|
| 4,310,839 A | 1/1982 | Schwerdt | |
| 4,503,294 A | 3/1985 | Matsumaru | |
| 4,618,754 A | 10/1986 | Gross | |
| 4,771,139 A | 9/1988 | Desmet | |
| 4,810,992 A | 3/1989 | Eventoff | |
| 5,008,497 A | 4/1991 | Asher | |
| 6,157,372 A | 12/2000 | Blackburn et al. | |
| 6,933,454 B2 * | 8/2005 | Ishibashi et al. | 200/341 |
| 7,910,843 B2 * | 3/2011 | Rothkopf et al. | 200/5 R |
| 2004/0085299 A1 | 5/2004 | Huang et al. | |
| 2009/0160529 A1 * | 6/2009 | Lamborghini et al. | 327/517 |
| 2010/0079309 A1 * | 4/2010 | Filson et al. | 341/20 |
| 2010/0079404 A1 * | 4/2010 | Degner et al. | 345/174 |
| 2010/0139990 A1 * | 6/2010 | Westerman et al. | 178/18.03 |

FOREIGN PATENT DOCUMENTS
EP   0 541 102 A1   5/1993
(Continued)

OTHER PUBLICATIONS

International Search Report w/translation from PCT/EP2008/057942 dated Oct. 9, 2008 (6 pages).
Ormond, T.; "Touch-responsive devices enable new applications"; EDN Electrical Design News, Reed Business Information, Highlands Ranch, Colorado, US; vol. 38, No. 2; Jan. 21, 1993; pp. 39-40, 42, 44 (4 pages).

*Primary Examiner* — Howard Williams
(74) *Attorney, Agent, or Firm* — Osha Liang LLP

(57) ABSTRACT

The invention relates to a control device that comprises a plate (7) having at least first (9) and second (11) adjacent portions, a flexible protection layer (3) covering the plate (7), and a touch-surface sensor (5) sandwiched between said protection layer (3) and the first portion (9) of the plate (7), characterized in that it comprises at least one hinging film (13) connecting the first portion (9) to the second portion (11) for hinging both portions (9, 11) relative to each other, the first portion (9) being fixed, and at least one switch (17) associated with the second portion (11) that is capable of pivotal movement between a raised rest position and an active position for activating the switch (17).

10 Claims, 2 Drawing Sheets

FOREIGN PATENT DOCUMENTS

| | | |
|---|---|---|
| FR | 2 538 991 A1 | 7/1984 |
| FR | 2 683 649 A1 | 5/1993 |
| FR | 2 798 329 A1 | 3/2001 |
| FR | 2 800 885 A1 | 5/2001 |
| WO | 2005/0050428 A2 | 6/2005 |

* cited by examiner

ELECTRIC CONTROL DEVICE

The present invention concerns an electric control device comprising a touch-sensitive surface, for example for a motorized mechanism for opening and/or closing at least one panel, for a multimedia screen electronic unit or for an air conditioning system, in particular for automobile vehicles.

Electric control devices integrating touch-sensitive surface sensors detect being pressed by a finger of a user and trigger a particular type of action or control function of an automobile vehicle as a function of the position where pressing is detected and/or the subsequent movement of the pressing position over the surface. See for example the documents FR 2 798 329, FR 2 800 885 and U.S. Pat. No. 6,157,372. These touch-sensitive surfaces can be of any type and can use different technologies.

For example, thanks to its ease of implementation and robustness, the technology using force sensing resistors (FSR) is rapidly gaining over other equivalent technologies, for example capacitive or optical technologies.

Such sensors are known for example as digitizer pads and the following documents may be cited as prior art: U.S. Pat. Nos. 4,810,992, 5,008,497, FR 2 683 649 or EP 0 541 102.

These sensors have a touch-sensitive surface including semiconductor layers sandwiched between a conductive layer and a resistive layer, for example.

Exerting pressure on the touch-sensitive surface reduces the ohmic resistance of the touch-sensitive surface, thus enabling measurement of the applied pressure and/or location of the place at which the pressure is applied by applying a suitable voltage.

In the automotive field there has been an increase in the number of electric units to be controlled and so multifunction control devices are increasingly being used because of their ergonomic advantages.

Nevertheless, control devices with a touch-sensitive surface are costly technologies and their use is limited to small control surfaces.

Also, assembling large touch-sensitive surfaces can cause implementation problems, in particular when sticking the touch-sensitive surface to the control device.

Thus it can be advantageous to combine these touch-sensitive surfaces with standard control solutions such as switches in the same control device.

The touch-sensitive control surface then for example selects a command in a pull-down menu to control the air conditioning, audio system or navigation system, for example.

Subsequently pressing a switch validates the command selection step, for example.

However, it must be possible to integrate these two control technologies into a multifunction control device having a uniform active control surface so that its use is transparent to the user.

The present invention therefore aims to propose an electric control device that is ergonomic for the user and provides both selection and switch actuation functions.

To this end the invention provides a control device that comprises a plate having at least first and second adjacent portions, a flexible protection layer covering the plate, and a touch-surface sensor sandwiched between said protection and the first portion of the plate, characterized in that it comprises at least one hinging film connecting the first portion to the second portion for hinging both portions relative to each other, the first portion being fixed and at least one switch associated with the second portion that is capable of pivotal movement between a raised rest position and an active position for activating a switch.

Other features and advantages of the invention emerge from the following description given by way of nonlimiting example with reference to the appended drawings, in which:

FIG. 1 is an exploded view of a control device 1 of the invention for electric or electronic units.

Figure 1:
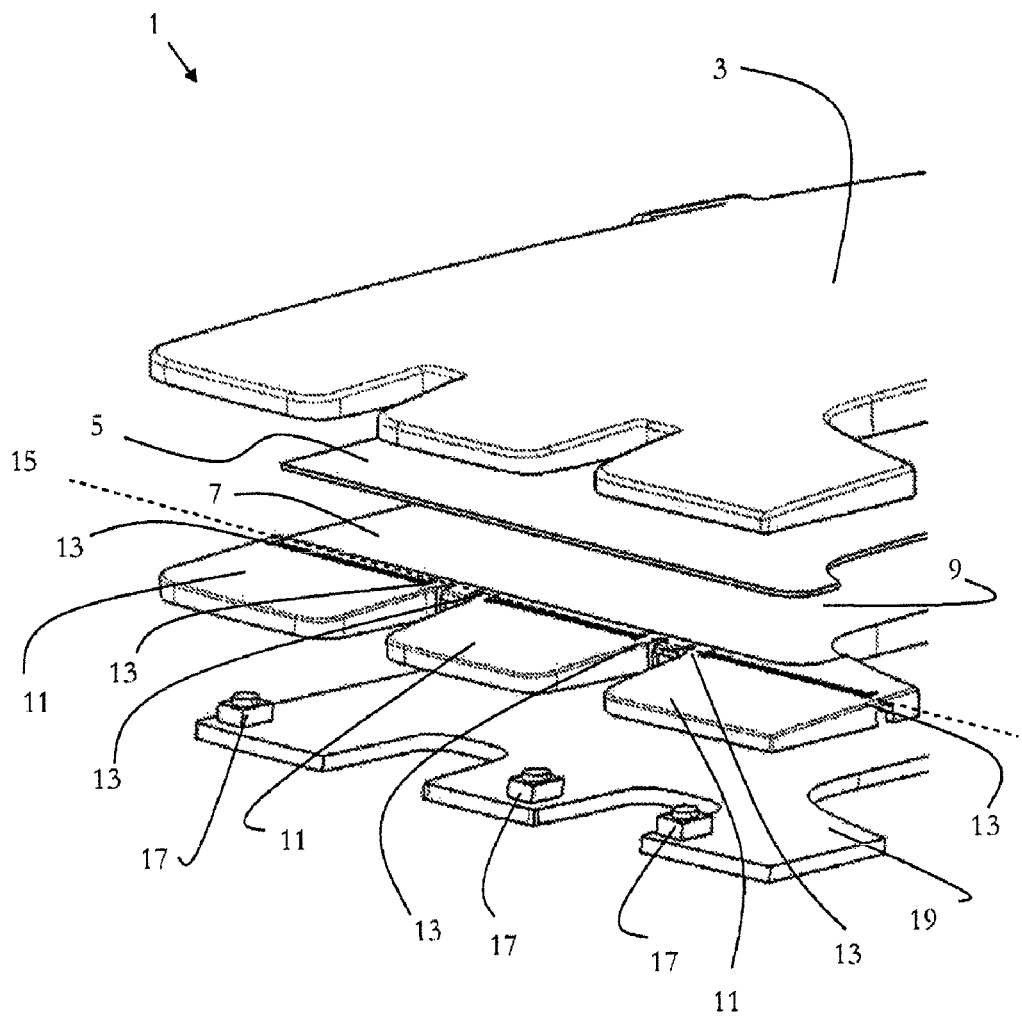
FIG. 1 is an exploded perspective view of a control device of the invention.

By electric or electronic units is meant, for example, an air conditioning system, an audio system, navigation system, a telephone system, motorized window regulator controls, external rear-view mirror adjustment controls, opening roof position adjustment controls, interior lighting controls or an automobile vehicle seat adjustment controls.

The control device 1 includes a flexible protection layer 3 and a touch-sensitive surface sensor 5 partly supported by a plate 7.

The sensor 5 and the plate 7 are covered by the flexible protection layer 3.

The flexible protection layer 3 is a skin, for example, produced in an elastic material, preferably in rubber or silicone, to guarantee effective protection of the sensor 5 against the risks of scratching or soiling at the same time as having a visual appearance and tactile qualities that are pleasant for the user.

The protection layer 3 is fixed laterally to the sides of the plate 7, for example.

Other more rigid materials that are non-elastic but deformable, such as polycarbonate, or materials based on mixtures of metal and silicone, can be used.

This flexible protection layer 2 can be opaque and incorporate at least one pictogram that is transparent or translucent, i.e. allows light to pass through, unlike the rest of the protection layer 3.

The pictograms can be engraved in the flexible protection layer 3, each pictogram being associated with at least one control function of the sensor 5.

The partly opaque protection layer 3 enables back-lighting of the pictograms, as described later.

Under the protection layer 3, the control device 1 includes the plate 7, preferably of plastic, having at least one first portion 9 and at least one second portion 11 that are adjacent.

The touch-sensitive surface sensor 5 is sandwiched between the protection layer 3 and the first portion of the plate 9, as can be seen in FIG. 1.

The touch-sensitive surface sensor 5 is advantageously a sensor responsive to the pressure exerted on the flexible protection layer 3, such as a touch-sensitive surface sensor using the FSR technology.

Alternatively, the touch-sensitive surface sensor 5 can be a capacitive sensor responsive to the variation of capacity exerted on the flexible protection layer 3.

According to the invention, the device 1 comprises at least one hinging film 13 connecting the first portion 9 of the plate 7 to the second portion 11. A hinging film is a wall portion the thickness of which is reduced in an area allowing pivoting.

In the device 1, the plate 7 therefore has at least one thinned area forming the hinging film 13 for articulating the two portions 9, 11 relative to each other about the axis 15.

Figure 2:
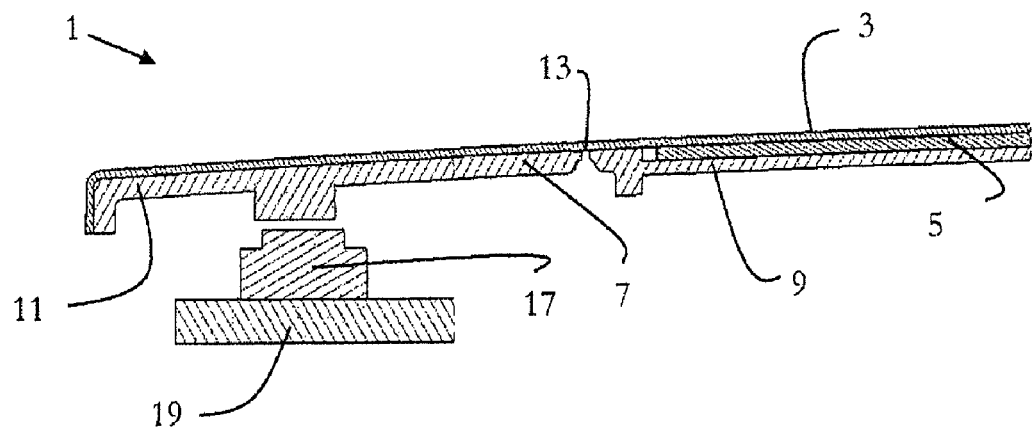
FIG. 2 is a view in section of a control device from FIG. 1 when assembled.

The first portion 9 of the plate 7 is fixed and the second portion 11 is mobile, pivoting between a raised rest position (a substantially horizontal position) shown in FIG. 2 and an active position (a position slightly lowered relative to the rest position).

This latter position is obtained, for example, by pressing with the end of a finger on the portion 11 of the plate 7. For example, the travel of the free end of the portion 11 to a lowered activating position is between at least one millimeter and a few millimeters, for example 5 mm. The active position is preferably the end of travel position obtained when pressing.

At least one switch 17 connected to a printed circuit card 19 of the control device 1 is associated with the second portion 11.

The switch 17 can be activated by the active position of the second portion 11.

Figure 3:
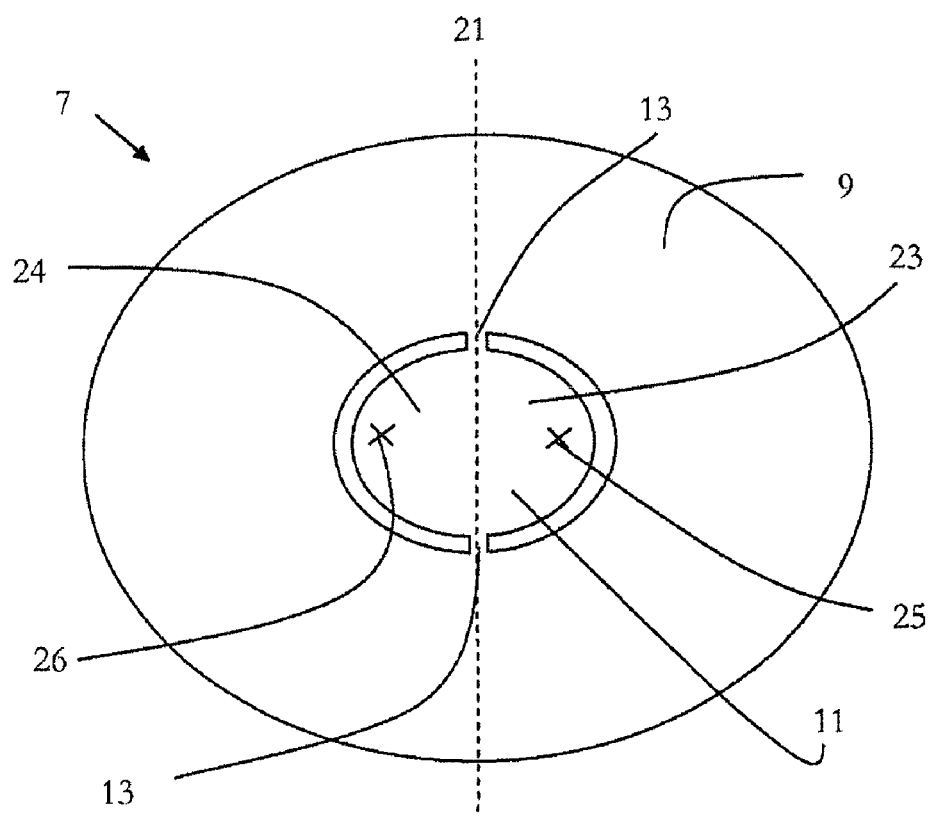
FIG. 3 is a plan view of a control device of a second embodiment of the invention.

In a first embodiment shown in FIGS. 1 to 3, the control device 1 includes two parallel spaced hinging films 13.

The second mobile portion 11 is advantageously situated at the periphery of the fixed first portion 9 and has the shape of a paddle.

Thus the control device 1 represented includes three switches 17 (FIG. 1) that can be activated by the pivoting of three mobile paddles 11.

The flexible protection layer 3 also includes at least one transparent or translucent pictogram associated with at least one control function of the switch 17.

The plate 7 and the touch-sensitive surface sensor 5 are also in part transparent or translucent.

Also, the electric control device 1 includes at least one light source disposed on the rear face of the plate 7 and arranged so that the light emitted by each light source forms a light spot of a size greater than or equal to the size of an associated pictogram to be illuminated on the flexible protection layer 3.

The backlighting of the pictograms is obtained by light-emitting diodes provided in the printed circuit card 19 to illuminate the rear face of the support plate 7 and thus the pictogram.

The switch 17 or the touch-sensitive surface 5 is advantageously adapted to activate the light sources.

In a second embodiment, the mobile second portion is surrounded by the fixed first portion.

The plate 7 of the control device 1 preferably includes two hinging films 13, as shown in FIG. 3.

Each hinging film 13 forms a pivot. The two pivots are formed on either side of the second portion 11 of the plate 7 forming a pivot axis 21 of the mobile portion 11.

In this figure, the mobile second portion 11 is generally disk-shaped.

The fixed first portion 9 can take the form of ring or a rectangle, for example.

A first part 23 of the disk 11 is advantageously adapted to activate a first switch.

This first switch is positioned facing the plate 7, at the location represented by the cross 25.

A second portion 24 of the disk 11 is adapted to activate a second switch positioned facing the plate 7 at the level of the cross 26.

It is therefore clear that the control device 1 is a robust and ergonomic device that is simple to fabricate at low cost, comprising at least a hinging film 13 articulating two portions 9, 11 of the plate 7, a fixed portion 9 carrying a touch-sensitive surface sensor 5 and another mobile portion 11 pivoting between a raised rest position and an active position to be able to activate the switch 17.

The invention claimed is:

1. A control device comprising:
    a plate comprising at least first and second adjacent portions, wherein a flexible protection layer covers the plate;
    a touch-sensitive surface sensor interposed between said protection layer and the first adjacent portion of the plate;
    at least one hinging film connecting the first adjacent portion to the second adjacent portion for hinging both adjacent portions relative to each other, wherein the first adjacent portion is fixed; and
    at least one switch associated with the second adjacent portion that is capable of pivotal movement between a raised rest position and an active position for activating the switch.

2. The control device as claimed in claim 1, further comprising two parallel spaced hinging films (13).

3. The control device as claimed in claim 1, wherein the second adjacent portion is mobile and is situated at the periphery of the fixed first adjacent portion.

4. The control device as claimed claim 3, wherein the mobile second adjacent portion has a shape of a paddle.

5. The control device as claimed in claim 3, wherein the mobile second adjacent portion is surrounded by the fixed first adjacent portion.

6. The control device as claimed in claim 5, wherein the device comprises two hinging films including two pivots formed on either side of the second adjacent portion of the plate and defining a pivot axis.

7. The control device as claimed in claim 5, wherein the second adjacent portion is disk-shaped.

8. The control device as claimed in claim 7, wherein a first part of the disk-shaped second adjacent portion is adapted to activate a first switch and a second part of the disk-shaped second adjacent portion is adapted to activate a second switch.

9. The control device as claimed claim 1, wherein the touch-sensitive surface sensor is a sensor responsive to the pressure exerted on the flexible protection layer.

10. The control device as claimed in claim 1, wherein the touch-sensitive surface sensor is a capacitive sensor responsive to the variation of capacity exerted on the flexible protection layer.

* * * * *

UNITED STATES PATENT AND TRADEMARK OFFICE
CERTIFICATE OF CORRECTION

| | | |
|---|---|---|
| PATENT NO. | : 8,279,092 B2 | Page 1 of 1 |
| APPLICATION NO. | : 12/665392 | |
| DATED | : October 2, 2012 | |
| INVENTOR(S) | : Stéphane Vanhelle et al. | |

It is certified that error appears in the above-identified patent and that said Letters Patent is hereby corrected as shown below:

On the Cover Page:

On the cover page, under item (75), Inventors, the inventor "Stephanie Vanhelle" should read -- Stéphane Vanhelle --.

On the cover page, under item (75), Inventors, the inventor "Stephanie Dalmayrac" should read -- Stephane Dalmayrac --.

Signed and Sealed this
Fourth Day of December, 2012

David J. Kappos
*Director of the United States Patent and Trademark Office*